United States Patent [19]

Ozawa et al.

[11] Patent Number: 5,365,308
[45] Date of Patent: Nov. 15, 1994

[54] PAPER MASK UNIT FOR PHOTOGRAPHIC PRINTER

[75] Inventors: Yoshio Ozawa, Kanagawa; Takashi Matsumoto; Kimitoshi Saito, both of Saitama, all of Japan

[73] Assignee: Fuji Photo Film Co., Ltd., Kanagawa, Japan

[21] Appl. No.: 911,589

[22] Filed: Jul. 10, 1992

[30] Foreign Application Priority Data

Jul. 12, 1991 [JP] Japan .................................. 3-198486
Jul. 12, 1991 [JP] Japan .................................. 3-198487

[51] Int. Cl.⁵ .............................................. G03B 27/58
[52] U.S. Cl. .................................... 355/74; 354/125
[58] Field of Search ............................. 355/74; 354/125

[56] References Cited

U.S. PATENT DOCUMENTS 4,745,444  5/1988  Miyawaki ............................. 355/74
4,766,492  8/1988  Miyawaki ............................ 355/125

FOREIGN PATENT DOCUMENTS 62-176842  11/1987  Japan .
63-43138   3/1988   Japan .

Primary Examiner—Richard A. Wintercorn
Attorney, Agent, or Firm—Sughrue, Mion, Zinn Macpeak & Seas

[57] ABSTRACT

A paper mask unit for setting a paper mask in an exposure station of a photographic printer. A mask frame of the paper mask unit has a paper guide member which is movable in a direction transverse to a paper transporting direction between a paper guide position for guiding photographic paper thereon and a rest position wherein the paper guide member is retracted from the exposure station. After the photographic paper is set in the exposure station, the mask frame is displaced apart from the photographic paper. When the paper mask is inserted into the mask frame through the mask guide path, the paper guide member is pushed by the paper mask inwards from the paper guide position into the rest position. Simultaneously, a letter printing aperture of the paper mask is automatically positioned on a lamp housing which is mounted on the paper guide member. Thereafter, the mask frame is moved into a masking position so as to bring the paper mask into contact with the photographic paper. The paper guide member is urged by springs to return to the paper guide position when the paper mask is removed from the mask frame.

15 Claims, 9 Drawing Sheets

PAPER MASK UNIT FOR PHOTOGRAPHIC PRINTER

BACKGROUND OF THE INVENTION

1. Field of the Invention

The present invention relates to a paper mask unit for use in setting a paper mask in an exposure station of a photographic printer.

2. Related Art

Conventionally, a long strip of photographic paper, which is wound in a roll, is used in a photographic printer, in order to make photographic prints efficiently. When the photographic paper is initially transported to the exposure station, the leading end of the photographic paper roll may be curled as it enters into an opening of the paper mask and thus jam against a margin of the paper mask opening.

For this reason, it has been suggested to insert a shielding plate for closing the mask opening during paper feeding, for example, in Japanese Laid-open Utility Model Application No. 63-43138. It has also been suggested to retract the photographic paper upward from a paper mask guide path in cooperation with insertion of a paper mask plate, when the paper mask plate is set in the exposure station (Japanese Laid-open Utility Model Application No. 62-176842).

However, a complicated mechanism is required for retracting the photographic paper upward in cooperation with insertion of the paper mask plate. Moreover, this solution does not take into account initial guiding of the photographic paper and, therefore, it is not well suited for automatic paper loading. In a case where the shielding plate is inserted during paper loading, it is necessary to manually insert and then remove the shielding plate every time a new strip of photographic paper is to be loaded. This procedure can be very cumbersome.

It is also known to print information about a picture frame along with the image thereof by illuminating a lithographic film with the information recorded thereon. The lithographic film is put on a letter printing aperture formed in the paper mask beside the picture image print frame. For this purpose, an additional lamp housing for illuminating the lithographic film is provided in the conventional paper mask unit.

When the size of the photographic paper is to be changed, the size of the paper mask must also be changed. In conventional paper masks, the position of the letter printing aperture varies depending on the mask size. Therefore, it is also necessary to change the position of the lamp housing in accordance with the mask size or the position of the letter printing aperture. As a result, the construction of the conventional paper mask unit is complicated.

SUMMARY OF THE INVENTION

In view of the foregoing, a primary object of the present invention is to provide a paper mask unit which is simple in construction and prevents the paper mask from jamming against a side edge of the photographic paper.

Another object of the invention is to provide a paper mask unit which facilitates automatic loading of the photographic paper.

A further object of the invention is to provide a paper mask unit in which the lamp housing for letter printing is automatically positioned in accordance with the mask size.

To achieve the above and other objects, a paper mask unit of the invention has a mask frame for holding a paper mask therein. The paper mask is removably inserted in a direction which is transverse to the photographic paper. A mask frame shifting device is provided for shifting the mask frame between a masking position wherein the paper mask held in the mask frame is in contact with the photographic paper set in an exposure station, and a retracted position wherein the paper mask held in the paper mask is disposed apart from the photographic paper.

According to the invention, the mask frame is shifted into the retracted position when the paper mask is changed. Therefore, the photographic paper cannot be damaged by the leading end of the paper mask that is inserted into the mask frame. Moreover, the mask frame shifting device has a simple construction.

According to a preferred embodiment of the invention, the paper mask unit also has a paper guide member, which includes at least a guide plate, for guiding the photographic paper thereon while the leading end of the photographic paper passes through the exposure station during paper loading. The paper guide member is mounted in the mask guide path in the mask frame, and is movable between a paper guide position for guiding the photographic paper wherein the paper guide member is placed in the exposure station and closes the mask frame so as to prevent the photographic paper from jamming into the mask frame, and a rest position wherein the paper guide member is retracted from the exposure station and the mask frame is open.

Because the paper guide member guides the photographic paper through the exposure station during paper loading and, thereafter, is pushed by the paper mask from the paper guide position into the rest position, as the paper mask is inserted into the mask frame, it is unnecessary to insert a separate shielding plate during paper loading.

By providing an engaging member for engaging the paper guide member with the paper mask and an urging device for urging the paper guide member to move to the paper guide position, the paper guide member is pushed, by the paper mask, from the paper guide position into the rest position when the paper mask is inserted in the mask frame, and automatically returns to the paper guide position when the paper mask is removed form the mask frame. Therefore, it is also unnecessary to insert a shielding plate when changing the photographic paper.

In the paper mask unit wherein the paper mask has a letter printing aperture disposed at a position near a picture print aperture, a lamp unit is disposed on the paper guide member, for illuminating a transparent film, such as a lithographic film, that has information thereon. The lamp unit is placed over the letter printing aperture, so as to print the literal information on the photographic paper. The lamp unit is disposed along a trailing end of the guide plate in relation to a mask inserting direction, and is disposed by a constant distance apart from the engaging member so that the letter printing aperture is automatically positioned on the lamp unit when the paper mask is engaged with the engaging member. P By maintaining the distance between a portion of the paper mask that is engaged with the engaging member, on one hand, and the letter printing aperture, on the other hand, constant for each paper mask, it is possible to automatically position the letter printing aperture on the lamp house even though the size of the paper mask has been changed.

BRIEF DESCRIPTION OF THE DRAWINGS

The above and other objects and advantages of the present invention will become apparent from the following detailed description of the preferred embodiments when read in connection with the accompanying drawings, wherein like reference numerals designate like parts throughout several views, and wherein.

DETAILED DESCRIPTION OF THE PREFERRED EMBODIMENT

Figure 1:
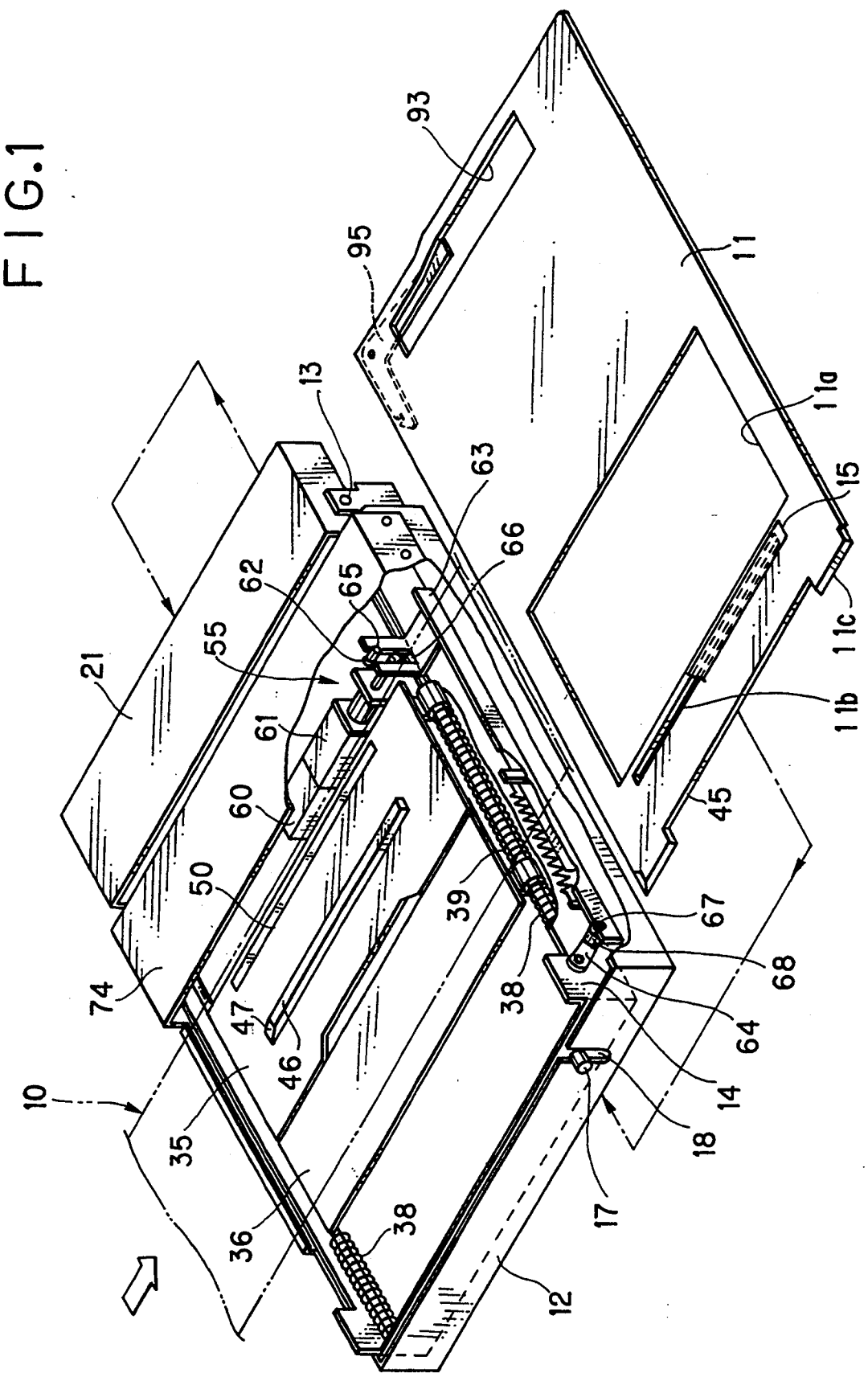
FIG. 1 is a perspective view of a paper mask unit according to a preferred embodiment of the invention.

Referring to FIG. 1, a paper mask unit according to a preferred embodiment of the present invention is placed in an exposure station of a photographic printer. A strip of photographic paper 10 is fed to the exposure station by a conventional paper transporting device (not shown). The paper mask unit for setting a paper mask 11 in the exposure station includes a rectangular fixed frame 12 and a mask fame 14 which is mounted to the fixed frame through a pair of axles 13, such that the mask frame 14 is pivotal downward with respect to the fixed frame 12 about the axle 13. The mask frame 14 also has a rectangular shape so as not to interfere with printing light that is projected toward the color paper 10 set in the exposure station.

A guide pin 17 is attached to a front end of the mask frame 14. The guide pin 17 is guided along a guide slit 18 which is formed in the fixed frame 12 and extends vertically, so as to prevent the mask frame 14 from pivoting beyond the fixed frame 12 and from vibrating in a paper transporting direction.

The paper mask 11 is formed with a picture print aperture 11a for printing each picture frame of photographic film, and a letter printing aperture 11b for printing information about the picture along with the picture frame. A lithographic film 15 having identifying information, or the like, such as "commemoration of graduation", printed thereon in a conventional manner is placed over the letter print aperture 11b.

Figure 2:
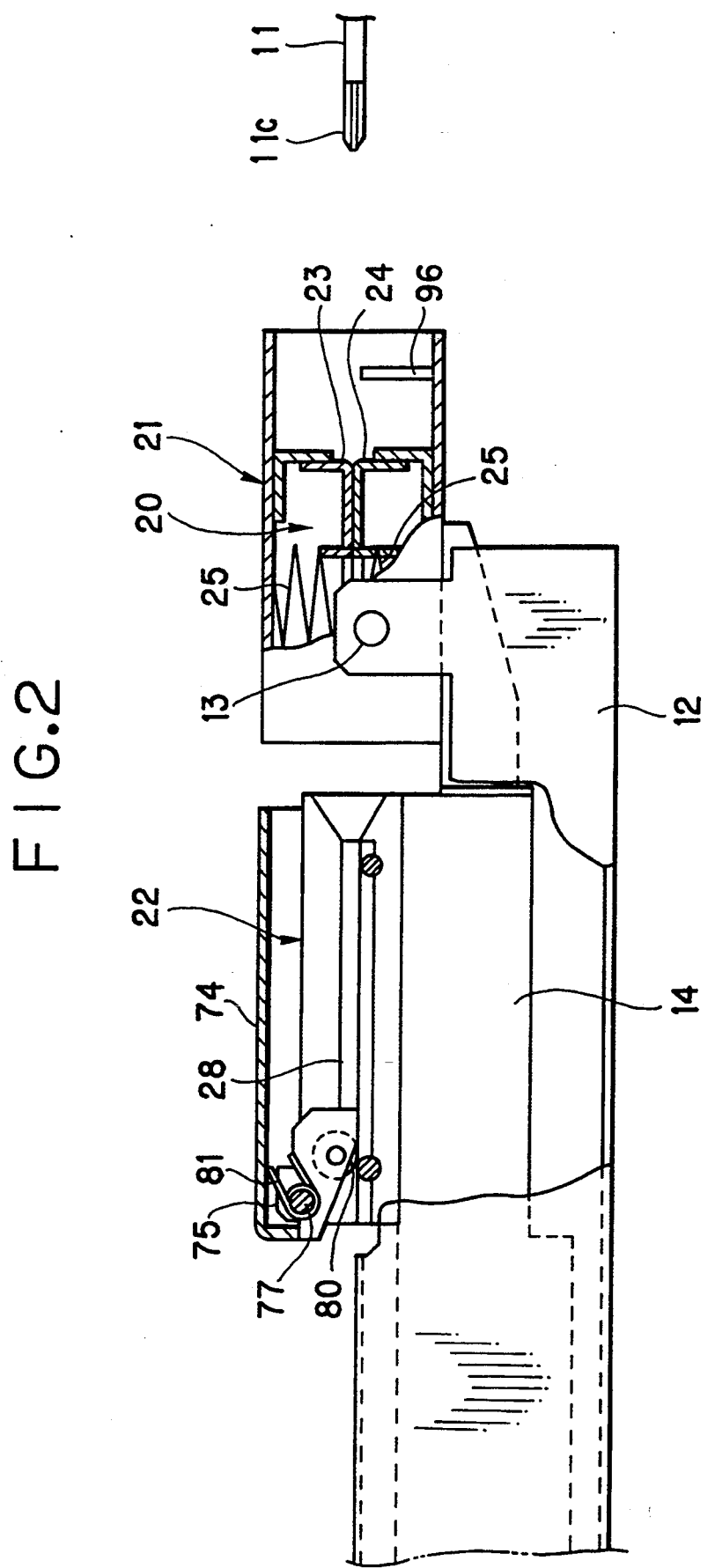
FIG. 2 is a side view of a mask inlet section and mask guide section of the preferred embodiment, partly in cross section.

The proper mask 11 is removably attached to the mask frame 14. For this purpose, the mask frame 14 has a mask inlet section 21 and a mask guide section 22 for setting the paper mask 11 in the exposure station, as shown in FIG. 2. The mask inlet section 21 is provided with a light shielding mechanism 20 including upper and lower shielding plates 23 and 24 which are urged by a coil spring 25 into contact with each other. The paper mask 11 is inserted through the light-shielding mechanism 20 while thrusting the shielding plates 23 and 24 aside by virtue of a tapered tip 11c of the paper mask 11. The mask guide section 22 include a mask guide groove 28 disposed on each side of the mask frame 14 and extending horizontally in the inner surface thereof. Both side edges of the paper mask 11 are slid along the mask guide grooves 28 when the paper mask 11 is inserted in the mask frame 14.

Figure 3:
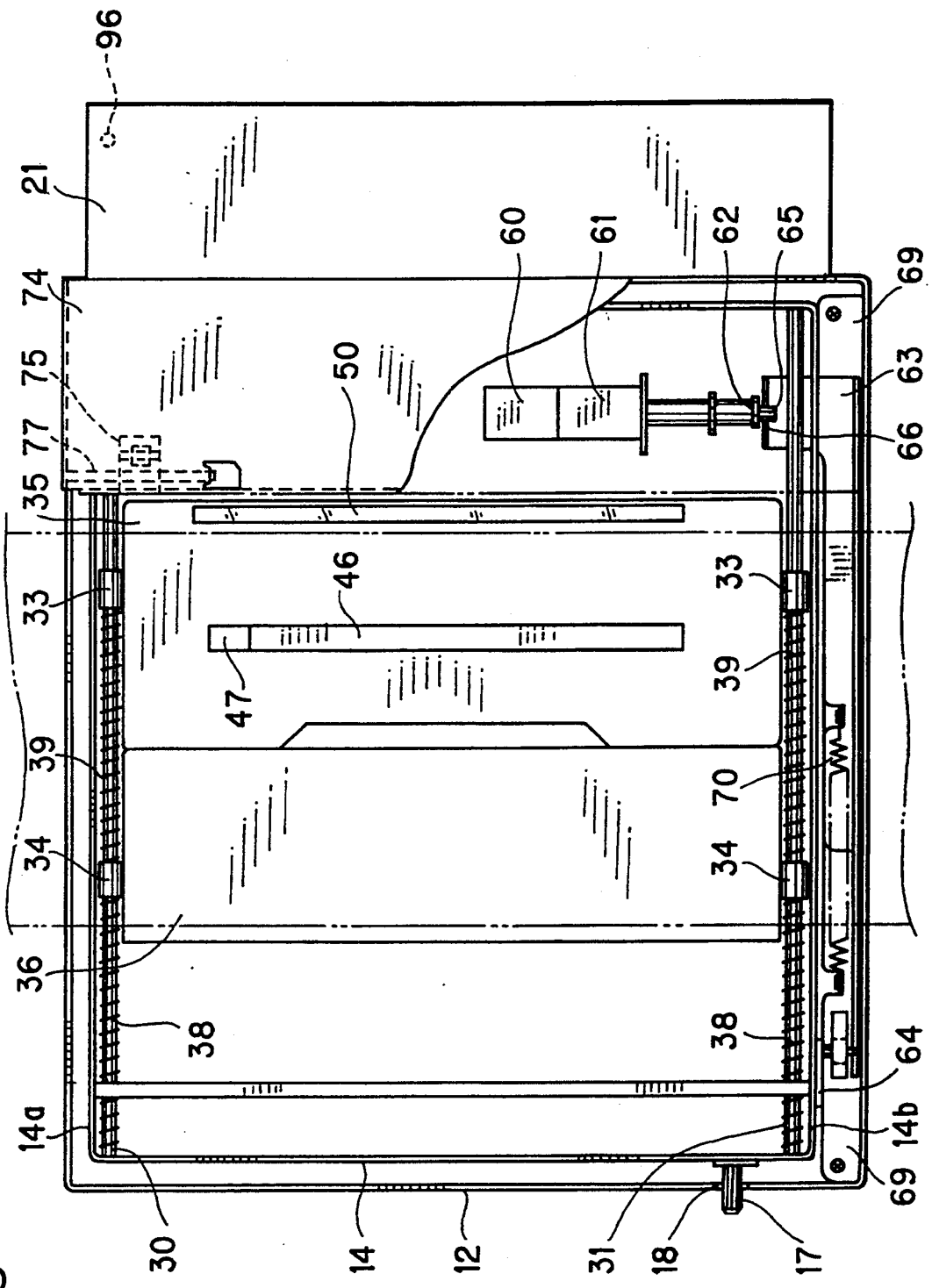
FIG. 3 is a plane view of the preferred embodiment, with portions broken away for clarity, showing a situation wherein guide plates close a mask frame.
Figure 4:
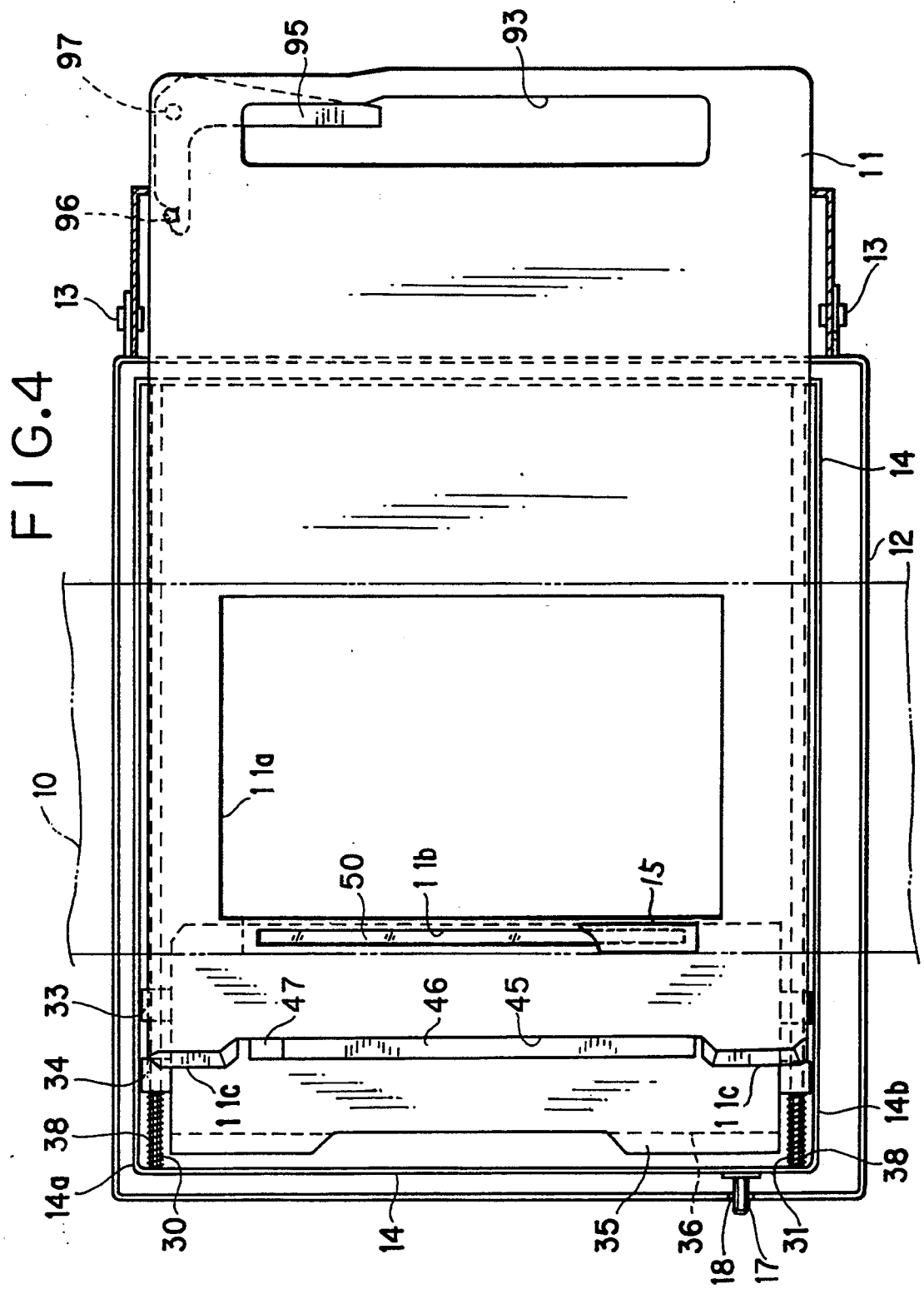
FIG. 4 is a horizontal section of the preferred embodiment, showing a situation wherein a paper mask is set in the mask frame.

As shown in FIGS. 1, 3 and 4, the mask frame 14 is provided with a couple of guide rods 30 and 31 extending across the width of the photographic paper 10. The guide rod 30 is disposed near a frame plate 14a that is located upstream in the paper transporting direction, and the guide rod 31 is disposed near a frame plate 14b that is located downstream in the paper transporting direction. First and second guide plate 35 and 36 are attached to the guide rods 30 and 31 through brackets 33 and 34, such that the first and second guide plate 35 and 36 are slidable along the guide rods 30 and 31, and that the first guide plate 35 is slidable over the second guide plate.

Figure 5:
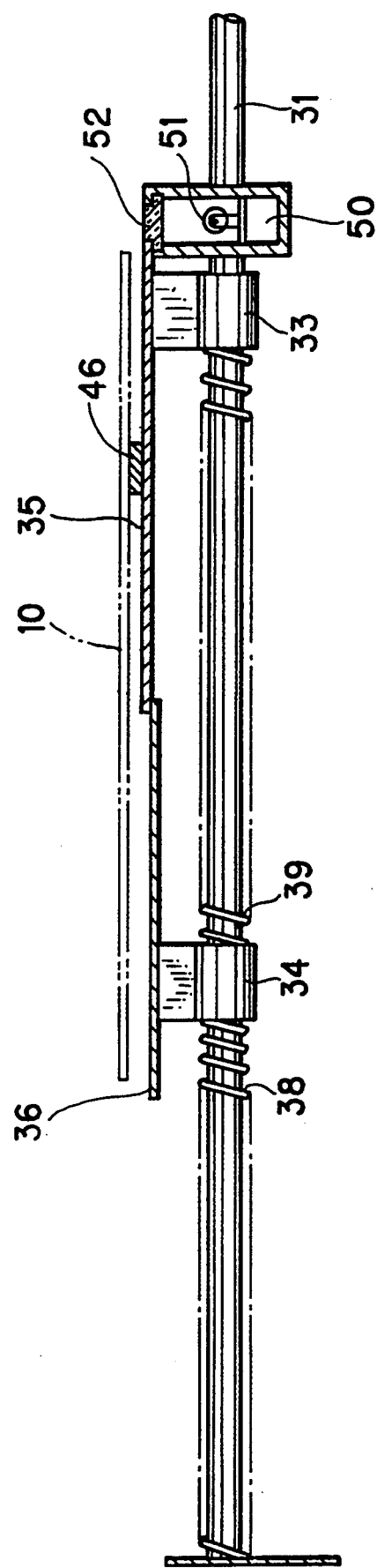
FIG. 5 is a vertical section of essential parts of a mechanism for sliding the guide plates, showing the same situation as FIG. 3.

Before the paper mask 11 is inserted in the mask frame 14, the guide plates 35 and 36 close an opening of the mask frame 14 and guide the photographic paper 10 thereon, as shown in FIG. 5. When the paper mask 11 is inserted in the mask frame 14, the guide plates 35 and 36 are moved into a position shown in FIG. 6, wherein the guide plates 35 and 36 are pushed by the paper mask 11 to be retracted from the exposure station and overlaid on one another. According to this construction, it is necessary to provide only a small space for retraction of these guide plates 35 and 36. This contributes to making the mask frame unit compact and small. Because coil springs 38 and 39 are mounted on the guide rods 30 and 31, respectively, for urging the guide plates 35 and 36 to move in a direction reverse to the mask inserting direction, the guide plates 35 and 36 are automatically moved back to the paper guide position shown in FIG. 5 when the paper mask 11 is removed from the mask frame 14.

As shown in FIGS. 1 and 4, the first guide plate 35 is provided with a ridge 46 which is brought into engagement with a recess 45 formed in a leading end of the paper mask 11 for enabling the paper mask 11 to push the first guide plate 35 as well as for positioning the paper mask 11 at the exposure station. The ridge 46 has a tapered area 47 at one end thereof that is disposed upstream in the paper transporting direction, the height of the tapered area 47 is gradually reduced so as to prevent the paper leading end from jamming against the edge of the ridge 46 when the first guide plate 35 is at the paper guide position of FIG. 5.

Figure 6:
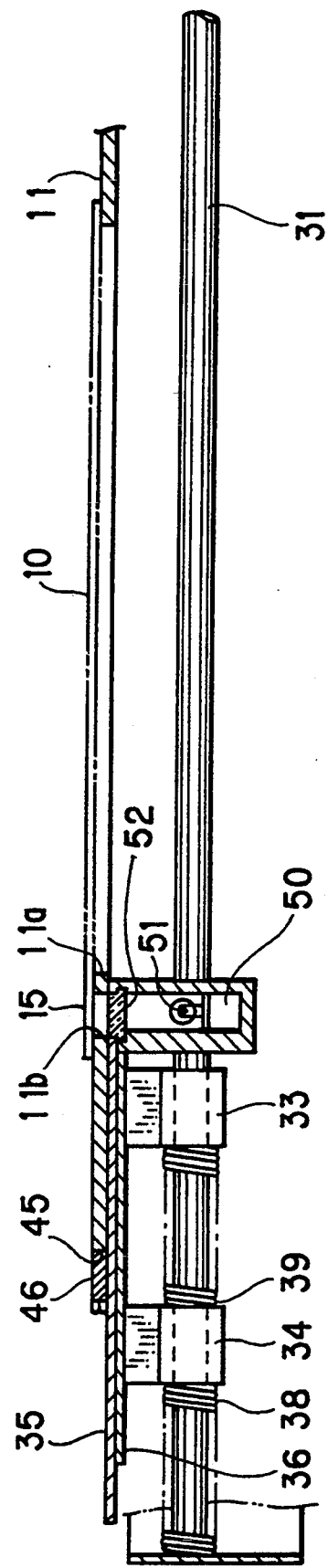
FIG. 6 is a view similar to FIG. 5, but showing the same situation as FIG. 4, wherein the guide plates are opened.

As shown in FIGS. 5 and 6, the first guide plate 35 is also provided with a lamp housing 50 disposed along a trailing end thereof. The lamp housing 50 accommodates a lamp 51 and a diffusion plate 52 for diffusing light from the lamp 51. The lamp house 50 serves to illuminate the lithographic film 15 put on the paper mask 11, so as to print the information on the lithographic film 15 onto the photographic paper 10.

Referring again to FIG. 1, a mask frame mechanism 55 is disposed between the fixed frame 12 and the mask frame 14. The mask frame mechanism 55 is adapted to move the mask frame 14 pivotally about the mounting axle 13 so as to retract the mask frame 14 downward from the paper transporting path. The mask frame mechanism 55 includes a motor 60, speed-reduction gears 61, a cam 62, a sliding plate 63 and an arm 64. As shown in FIGS. 1 and 3, the rotation of the motor 60 is decelerated by the speed reduction gears 61, and the cam 62 is rotated by the decelerated rotation.

Figure 7:
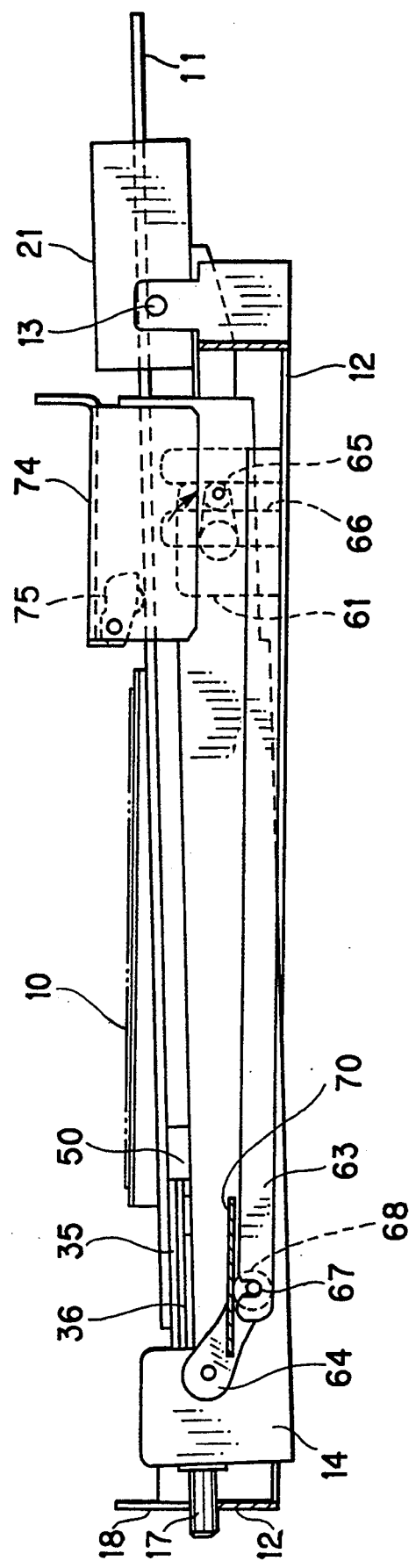
FIG. 7 is a side view of the preferred embodiments, showing a situation wherein the mask frame is in a retracted position.

A roller 65 of the cam 62 is initially placed in the upper most position as shown in FIG. 1. When the cam 62 is turned by the rotation of the motor 60 through an angle of 90 degrees into a position as shown in FIG. 7, in response to a mask set signal from a controller (not-shown), the sliding plate 63 is moved toward the paper inlet section 21 through engagement of the roller 65 in a cam slit 66 of the sliding plate 63. The arm 64 connected to the sliding plate 63 through a pin 67 is also turned in cooperation with the sliding plate 63, so that the mask frame 14 is pivotally moved downward.

Because the pin 67 is provided with a roller 68, the movement of which is limited by a guide rail 70, so as not to move up and down. The mask frame 14 is removed downward from the photographic paper 10 through the arm 64 when the sliding plate 63 is slid from the initial position shown in FIG. 1 to the position shown in FIG. 7, that is, the mask frame retracted position. It is to be noted that the mask frame 14 directly contacts the color paper 10 when the mask frame mechanism 55 is in the situation shown in FIG. 1.

As shown in FIG. 3, the sliding plate 63 is slid on a supporting plate 69. A spring 70 is suspended between the sliding plate 63 and the supporting plate 59 so as to urge the sliding plate 63 toward the arm 64, that is, urge the sliding plate 63 to stay in the printing position. In this way, it is possible to provide sufficient play between the pin 65 of the cam 62 and the guide slit 66.

Figure 8:
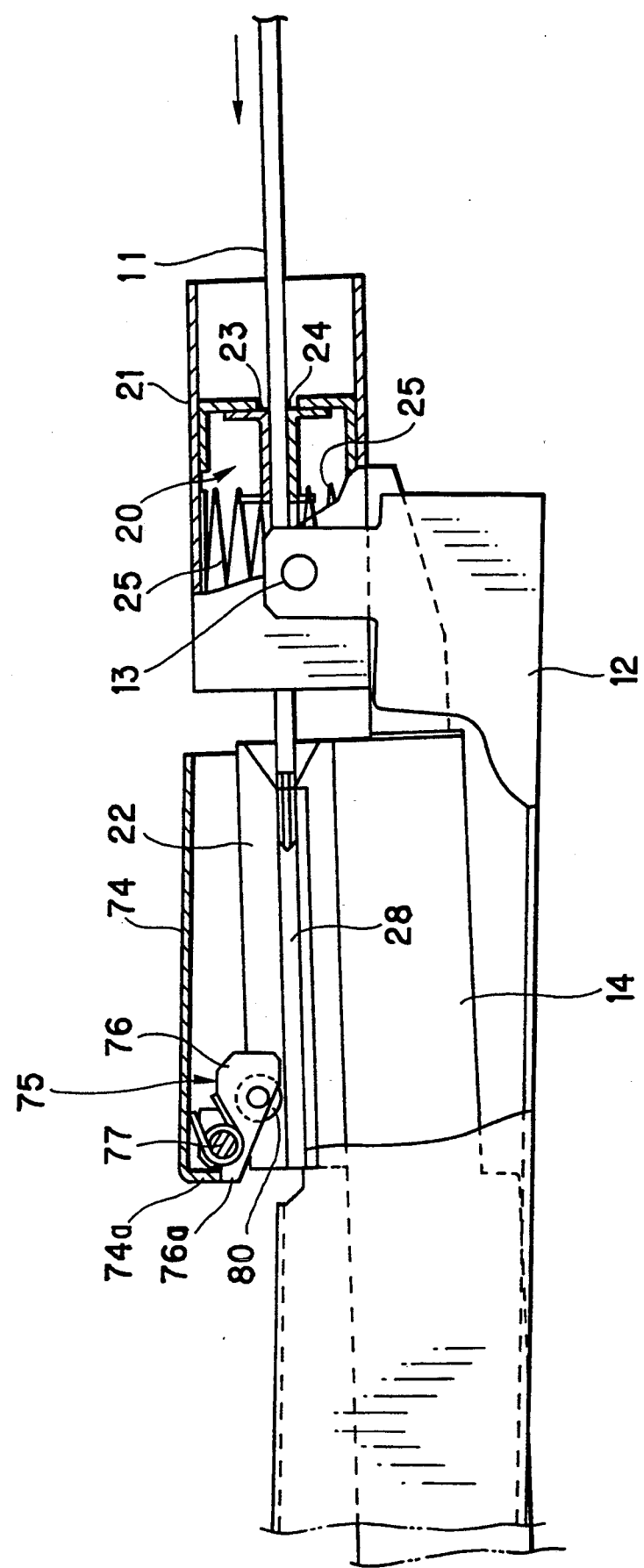
FIG. 8 is a view similar to FIG. 2, but showing the same situation as FIG. 7, wherein a stopper is retracted from a paper mask path.

As shown in FIG. 8, the paper mask 11 is inserted in the mask frame 14 when the mask frame 14 is in the above-described mask frame retracted position. Because the mask frame 14 is disposed apart from the photographic paper 10, in this position, the leading end of the paper mask 11 will not jam against the edge of the photographic paper 10 and thus will not harm the photographic paper 10.

As shown in FIGS. 2, 3 and 8, the mask frame 14 is also provided with stoppers 75 disposed near the guide rods 30 and 31 limiting the insertion of the paper mask 11 in the mask frame 14. Each stopper 75 is constructed by a stopper block 76 rotatably mounted to a top cover plate 74 of the fixed frame 12 through a mounting axle 77. The stopper blocks 76 are provided with a guide roller 80 each, for guiding the paper mask 11 when being removed from the mask frame 14.

A coil spring 81 is mounted on each mounting axle 77, so as to urge the stopper block 76 to rotate downward. The downward rotation of the stopper block 76 is limited by the top cover plate 74 such that a portion 76a of the stopper block 76 contacts against an edge portion 74a of the top cover plate 74 that is bent downward. In this manner, the stopper 75 protrudes into the mask guide path defined by the mask guide grooves 28, when the mask frame 14 is set in the position shown in FIGS. 1 and 2 wherein the mask frame 14 is in contact with the photographic paper. As a result, the paper mask 11 cannot be inserted in this situation.

When the mask frame 14 is moved in the mask frame retracted position, the stopper 75 is removed from the mask guide path because the stopper 75 will not move downward because of contact with the edge portion 74a. As a result, the insertion of the paper mask 11 into the mask frame 14 is allowed.

Figure 9:
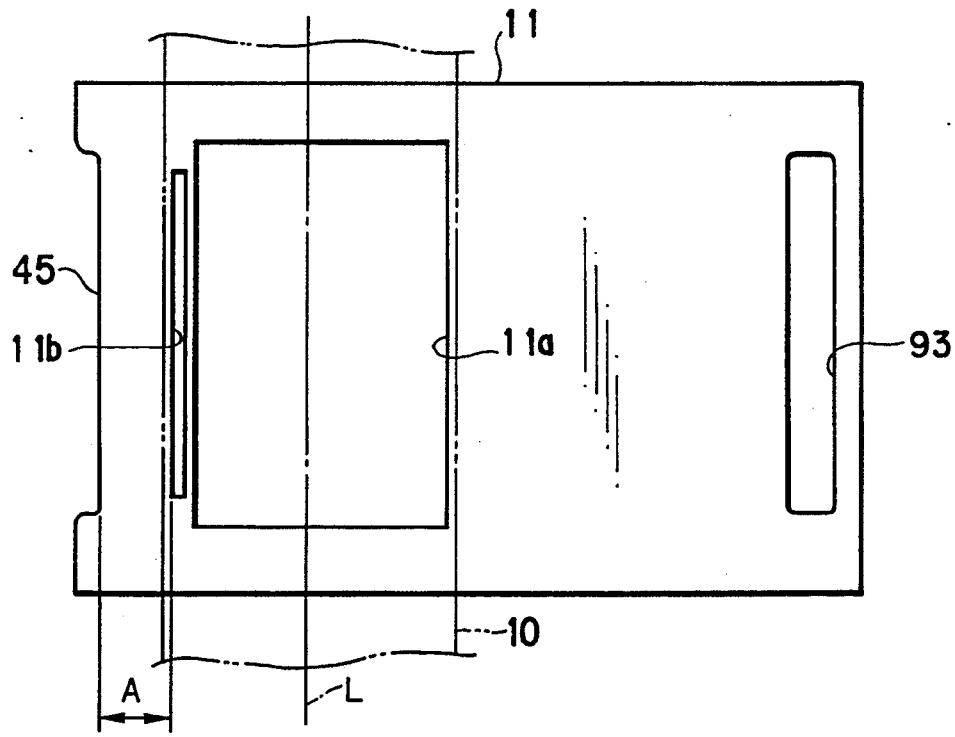
FIG. 9 schematically shows a paper mask for large size photographic prints, set in the exposure station.
Figure 10:
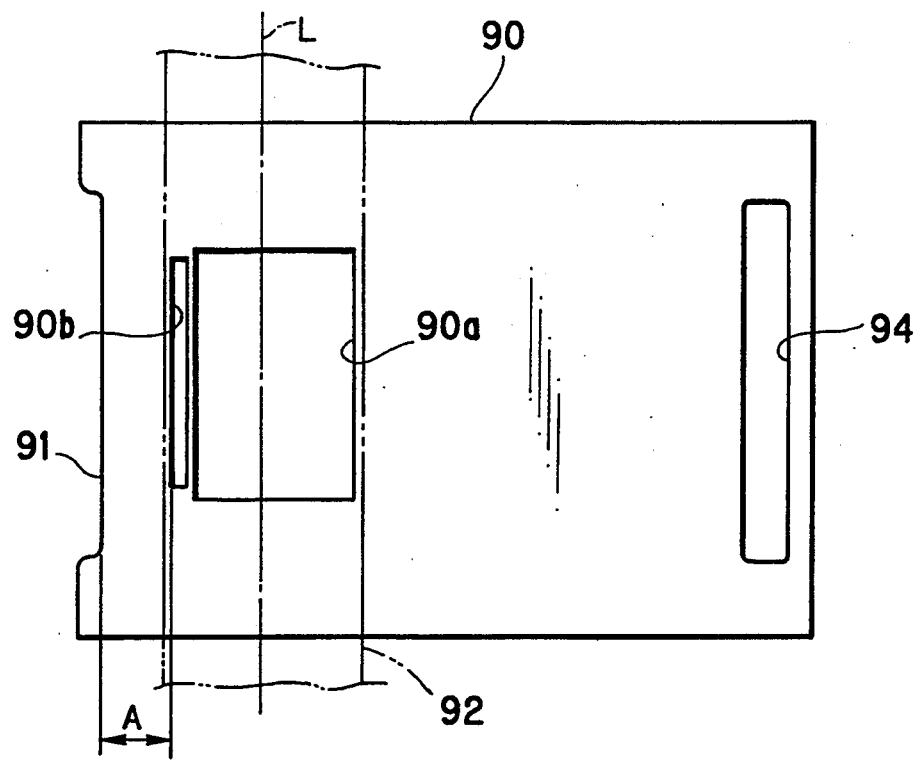
FIG. 10 schematically shows a paper mask for post card size photographic prints, set in the exposure station.

Referring now to FIGS. 9 and 10, there may be several types of paper masks for printing various sizes of photographic prints. For example, while the paper mask 11 is directed to use for large size prints, a paper mask 90 shown in FIG. 10 is directed to use for post card size prints. The paper mask 90 also has a picture print aperture 90a, a letter printing aperture 90b and a recess 91. The letter printing aperture 90b is disposed by a distance "A" apart from the recess 91 of the leading end of the paper mask 90. This distance "A" remains unchanged in every kind of paper mask used in the paper mask unit.

Accordingly, the letter print aperture 11b or 90b is always set in a position corresponding to the lamp housing 50 on the first guide plate 35 even when the kind or size of the paper mask is changed. It is to be noted that 92 designates color paper for postcard size prints, "L" designates the center lines of the photographic papers 10 and 92.

The paper masks 11 and 90 also have openings 93 and 94, respectively, for forming a grip so as to aid in handling. Referring again to FIGS. 1 and 4, an L-shaped lock lever 95 is pivotally mounted on the rear surface of the paper mask 11 through an axle 97. One end of the lock lever 95 protrudes into the opening 93. The other end of the lock lever 95 has a hook formed thereon which can be engaged with a lock pin 96 securely disposed on the inner bottom wall of the mask inlet section 21. The hook is disengaged from the lock pin 96 when the protruding end of the lock lever 95 is gripped by hand along with the grip 93 of the paper mask 11 so as to rotate the lock lever 95 slightly in the counter-clockwise direction in FIG. 4. In this way, the paper mask 11 is arrested in the mask frame 14 through engagement between the lever and the lock pin 96 when the lock lever 95 is released, after the paper mask 11 is fully inserted in the mask frame 14.

Next, the operation of the above-described embodiment will be described.

When the photographic paper 10 is to be loaded in a photographic printer, the paper mask 11 is removed from the paper mask unit. By pulling out the paper mask 11 from the mask frame 14 from the position shown in FIG. 6, the guide plates 35 and 36 are moved to close the opening of the mask frame 14, as shown in FIG. 5, due to the force of the coil springs 38 and 39. As a result, the leading end of the photographic paper 10 is guided on the guide plates 35 and 36, the photographic paper 10 is then automatically loaded in the exposure station by a loading device (not shown).

After the photographic paper 10 is completely loaded, the controller is set in a paper mask set mode. In this mode, first the motor 60 starts rotating to retract the mask frame 14 downward from the photographic paper 10 into the mask frame retracted position shown in FIG. 7, through engagement between the sliding plate 63 and the cam 62 and the arm 63. In the mask frame retracted position, the stopper 75 is removed from the mask guide path of the mask guide section 74, as shown in FIG. 8, it becomes possible to insert the paper mask 11 in the mask frame 14.

When the paper mask 11 is inserted in the frame mask 14 through the mask inlet section 21, the recess 45 of the paper mask 11 strikes against the stopper 46 on the first guide plate 35, so that the first guide plate 35 is pushed inward of the paper mask unit by further inserting the paper mask 11. Also, the second guide plate 36 is moved inward in cooperation with the first guide plates 35. When the paper mask 11 has been inserted in the mask frame 14 as shown in FIG. 4, the lock lever 95 of the paper mask 11 is engaged with the lock pin 96, so that the paper mask 11 is fixed in the mask frame 14. In this situation, the lamp housing 50 is positioned on the letter printing aperture 11b of the paper mask 11.

Thereafter, the mask frame 14 is moved upward from the mask frame retracted position into a masking position wherein the paper mask 11 is in contact with the photographic paper 10. Then, the information on the lithographic film 15 is printed onto the photographic paper 10 in an area defined by the letter print aperture 11b. Simultaneously, a picture frame image recorded on photographic film is printed onto the photographic paper 10 in an area defined by the picture print aperture 11a, in a conventional manner. The following picture frames are printed sequentially on the photographic paper 10 in the same way as above.

When the paper mask 11 is to be changed, the motor 60 is rotated to move the mask frame 14 into the mask frame retracted position. Then, the paper mask 11 is removed from the mask frame 14. Thereby, the first and second guide plates 35 and 36 are moved along with the paper mask 11 due to the force of the coil springs 38 and 39, in a direction to close the opening of the mask frame 14. Thereafter, a new paper mask, for example, a paper mask having another lithographic film containing different information is inserted in the mask frame 14. The guide plates 35 and 36 are pushed inward by the new paper mask to be retracted from the exposure station, and a letter printing aperture of the new paper mask is positioned on the lamp housing 50 by virtue of the engagement between a recess formed in the leading end of the new paper mask and the ridge 46. Thereafter, the mask frame 14 is moved upward from the retracted position so as to bring the new paper mask into contact with the photographic paper 10. In this position, a printing operation is conducted in the same manner as described above.

When the photographic paper 10, and if necessary the paper mask 11, is to be changed, the motor 60 is rotated to move the mask frame 14 into the mask frame retracted position. Then, the paper mask 11 is removed from the mask frame 14. Thereby, the first and second guide plates 35 and 36 are moved following the paper mask 11 due to the force of the coil springs 38 and 39, into the paper guide position wherein the opening of the mask frame 14 is closed. Thereafter, the motor 60 is rotated to move the mask frame 14 into the position shown in FIG. 2. In this situation, the photographic paper 10 is rewound into a paper magazine (not shown), and a new paper magazine is set in the photographic printer, for loading a different type of photographic paper, for example, the photographic paper 92 (see FIG. 10).

After the new photographic paper 92 has been loaded, the mask frame 14 is retracted, and a new paper mask, for example, the paper mask 90 is inserted in the mask frame 14. The guide plates 35 and 36 are pushed inwards by the paper mask 90 to be retracted from the exposure station. The letter printing aperture 90b of the paper mask 90 is positioned on the lamp housing 50 by virtue of the engagement between the recess 91 of the paper mask 90 and the ridge 46. Thereafter, the mask frame 14 is moved upward from the retracted position so as to bring the paper mask 90 into contact with the new photographic paper 92. In this situation, a printing operation is conducted in the same manner as described above.

Although the above-described mechanism for shifting the mask frame 14 includes the cam 62 rotated by the motor 60 to slide the sliding plate 63, so as to pivotally move the mask frame by a predetermined angle through the arm 64, it is possible to use a solenoid, or the like, for shifting the mask frame 14. Furthermore, in place of the first and second guide plates 35 and 36, a single guide plate or more than two guide plates may be used. Also, the controller utilized in the invention may be a microprocessor based device, hardwired electrical device, a mechanical device or any other type of controller.

While the present invention has been described in detail above with reference to a preferred embodiment shown in the drawings, it will be apparent to those skilled in the art that various changes and modifications of the present invention are possible without departing from the scope of the invention as defined by the following claims.

What is claimed is:

1. A paper mask unit for setting a paper mask in an exposure station of a photographic printer in contact with photographic paper, said paper mask unit comprising:

a mask frame for holding said paper mask therein, said paper mask being removably inserted in said mask frame by being slid along a mask guide path in a direction transverse to said photographic paper;

a stopper coupled to said mask frame so as to be disposed in said mask guide path of said mask frame, for preventing insertion of said paper mask into said exposure station, when said mask frame is placed in said masking position, said stopper being retracted from said mask guide path when said mask frame is placed in said retracted position; and a mask frame shifting device coupled to said mask frame so as to shift said mask frame between a masking position wherein said paper mask is in contact with said photographic paper, and a retracted position wherein said paper mask is spaced apart from said photographic paper, said mask frame shifting device comprising a motor and a transmission mechanism for transmitting rotational movement of said motor to said mask frame.

2. A paper mask unit as recited in claim 1, wherein said mask frame is pivotally mounted to a fixed frame, and said stopper is secured to said fixed frame and is urged by a spring to protrude into said mask guide path to a degree such that said stopper does not extend into said mask guide path when said mask frame is shifted into said retracted position.

3. A paper mask unit as recited in claim 2, further comprising a lock device coupled to said mask frame for locking said paper mask at said exposure station.

4. A paper mask unit for setting a paper mask in an exposure station of a photographic printer in contact with photographic paper, said paper mask unit comprising:

a mask frame for holding said paper mask therein, said paper mask being removably inserted in said mask frame by being slid along a mask guide path in a direction transverse to said photographic paper;

a mask frame shifting device coupled to said mask frame so as to shift said mask frame between a masking position wherein said paper mask is in contact with said photographic paper, and a retracted position wherein said paper mask is spaced apart from said photographic paper; and a paper guide member for guiding said photographic paper thereon while said photographic paper is transported through said exposure station, said paper guide member being mounted in said mask frame and movable in said mask guide path between a paper guide position for guiding said photographic paper thereon, wherein said paper guide member is placed in said exposure station and covers said mask frame, so as to prevent said photographic paper from jamming into said mask frame, and a rest position wherein said paper guide member is retracted from said exposure station.

5. A paper mask unit as recited in claim 4, further comprising:

an engaging member formed on said paper guide member so as to engage with said paper mask when said paper mask has been inserted in said mask frame, said paper mask pushing said paper guide member from said paper guide position into said rest position, by virtue of engagement with said engaging member, as said paper mask is inserted in said mask frame; and a biasing device coupled to said paper guide member so as to urge said paper guide member into said paper guide position.

6. A paper mask unit as recited in claim 5, further comprising a lock device coupled to said mask frame for locking said paper mask at said exposure station.

7. A paper mask unit as recited in claim 6, wherein said paper mask has a picture print aperture formed therein so as to define an area for printing an image frame onto said photographic paper, an auxiliary print aperture also being formed in said paper mask at a position near said picture print aperture, a transparent film having information printed thereon being placed over said letter print aperture, said paper mask unit further comprising a lamp unit disposed on said paper guide member, said lamp unit being in opposition to said auxiliary aperture when said paper mask is engaged with said engaging member to illuminate said transparent film and print said information on said photographic paper.

8. A paper mask unit as recited in claim 7, wherein said transparent film is a lithographic film.

9. A paper mask unit as recited in claim 7, further comprising:

a plurality of said paper masks each having a corresponding of said picture print apertures formed therein which are different in size from one another, each of said paper masks also having a corresponding of said auxiliary print apertures formed therein and disposed a constant distance apart from a portion of said paper mask that is engaged with said engaging member, such that said letter print aperture is always positioned on said lamp unit when any one of said paper masks is engaged with said engaging member.

10. A paper mask unit as recited in claim 9, wherein said paper guide member includes at least a first guide plate slidably mounted in said mask guide path, said lamp unit being disposed along a trailing end of said guide plate in relation to a mask inserting direction, and said engaging member being disposed on one surface of said first guide plate on which said photographic paper is guided.

11. A paper mask unit as recited in claim 10, wherein said paper guide member further includes a second guide plate slidably mounted in said mask guide path, and said first guide plate is overlapping said second guide plate when said first and second guide plates are in said rest position.

12. A paper mask unit as recited in claim 11, wherein said engaging member is a ridge extending in a paper transporting direction, said paper mask having a recess formed along a leading edge thereof, said recess being engaged with said ridge.

13. A paper mask unit as recited in claim 12, wherein one end of said ridge that is disposed upstream of said paper transporting direction is tapered in height.

14. A paper mask unit as recited in claim 9, wherein said paper mask has an opening, for forming a grip, formed in a trailing end thereof.

15. A paper mask unit as recited in claim 14, wherein said lock device includes an L-shaped lever pivotally mounted to a trailing end of said paper mask, a first end of said lever protruding into said opening, and a pin disposed on said mask frame, said pin being engaged with a second end of said lever when said paper mask is set at said exposure station, said pin being disengaged from said second end of said lever when said first end is pivoted away from said opening.

* * * * *